No. 61,792.　　　　　　　　　　　　　　　　PATENTED FEB. 5, 1867.
G. ARRISON.
WATER WHEEL.

Witnesses:　　　　　　　　　　　　　　　　Inventor:

United States Patent Office.

GEORGE ARRISON, OF TRENTON. NEW JERSEY.

Letters Patent No. 61,792, dated February 5, 1867.

IMPROVEMENT IN WATER-WHEELS.

The Schedule referred to in these Letters-Patent and making part of the same.

TO ALL WHOM IT MAY CONCERN:

Be it known that I, GEORGE ARRISON, of Trenton, in the county of Mercer, and State of New Jersey, have invented a new and improved Water-Wheel; and I do hereby declare that the following is a full, clear, and exact description thereof, which will enable others skilled in the art to make and use the same, reference being had to the accompanying drawings, forming a part of this specification, in which—

Similar letters of reference indicate like parts.

Figure 1:
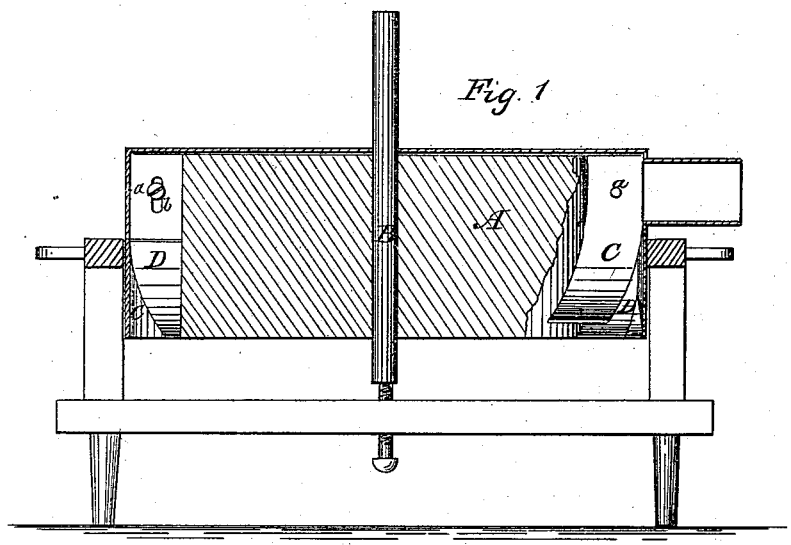
Figure 1 represents a vertical section of this invention.
Figure 2:
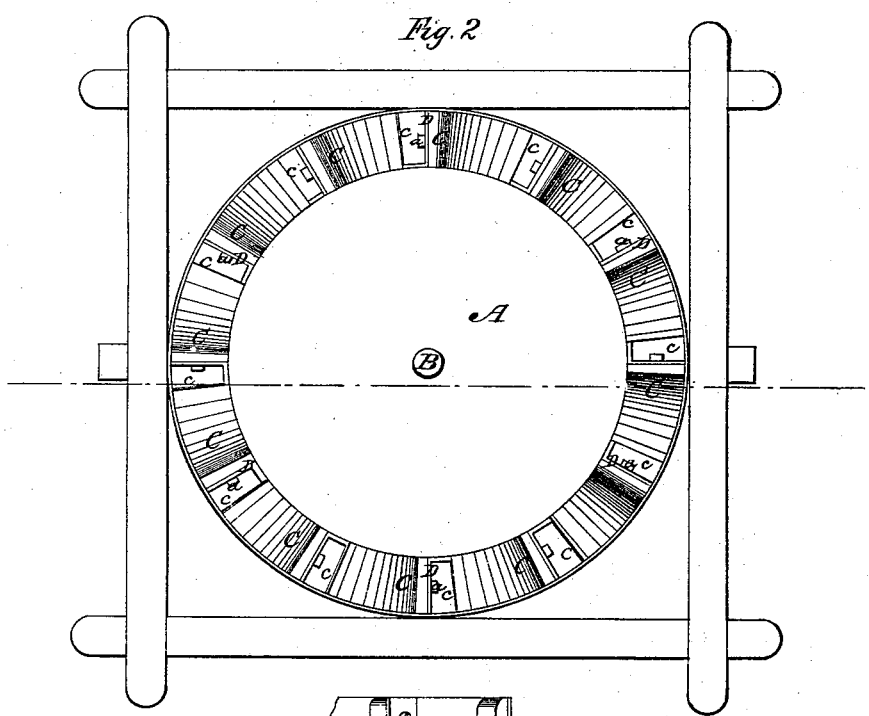
Figure 2 is a plan or top view of the same.
Figure 3:
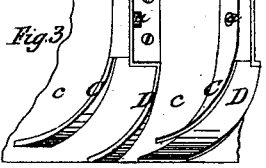
Figure 3 is a partial side elevation of the same.

This invention consists in the arrangement of additional buckets between the ordinary buckets of water-wheels, said additional buckets being adjustable by means of set-screws in such a manner that by raising or lowering said adjustable buckets or gates, the water spaces of the wheel can be regulated according to the aggregate amount of water passing through the wheel, and said water can be used to the best advantage.

A represents a water-wheel, which is mounted on the shaft B in the ordinary manner. Said wheel is provided with curved buckets C, and with additional buckets or gates D, and said gates are secured behind the buckets by set-screws, a, passing through slots b. By these means the gates D can be readily adjusted up or down, and the water spaces or channels c between them and the buckets C can be enlarged or diminished at pleasure. The wheel can thus at all times be readily adjusted, according to the quantity of water to be had, and the water can be used to the best advantage.

Having thus described my invention, I claim as new, and desire to secure by Letters Patent—

The gates D, made adjustable by set-screws a, and slots b, in combination with the buckets C of a water-wheel, constructed and operating substantially as and for the purpose described.

GEORGE ARRISON.

Witnesses:
 MORRIS MOSES,
 DANIEL PETERS.